S. C. FARANDA.
METHOD OF MAKING INTERIOR FINISH AND TRIM.
APPLICATION FILED SEPT. 7, 1916.

1,210,158.  Patented Dec. 26, 1916.

INVENTOR.
Santo Calogero Faranda.
BY
ATTORNEY.

UNITED STATES PATENT OFFICE.

SANTO CALOGERO FARANDA, OF BURNSIDE, CONNECTICUT.

METHOD OF MAKING INTERIOR FINISH AND TRIM.

1,210,158.          Specification of Letters Patent.     Patented Dec. 26, 1916.

Application filed September 7, 1916. Serial No. 118,830.

*To all whom it may concern:*

Be it known that I, SANTO CALOGERO FARANDA, a subject of the King of Italy, residing at Burnside, in the county of Hartford and State of Connecticut, have invented a new and useful Improvement in Methods of Making Interior Finish and Trim, of which the following is a specification.

This invention relates to the method of finishing walls, casings, columns and the like in rooms and passage ways of buildings, particularly bath rooms, kitchens, vestibules and halls.

The object of the invention is to provide an inexpensive finish which very closely resembles natural polished marble.

Figure 1:
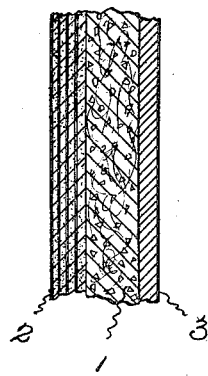
Figure 2:
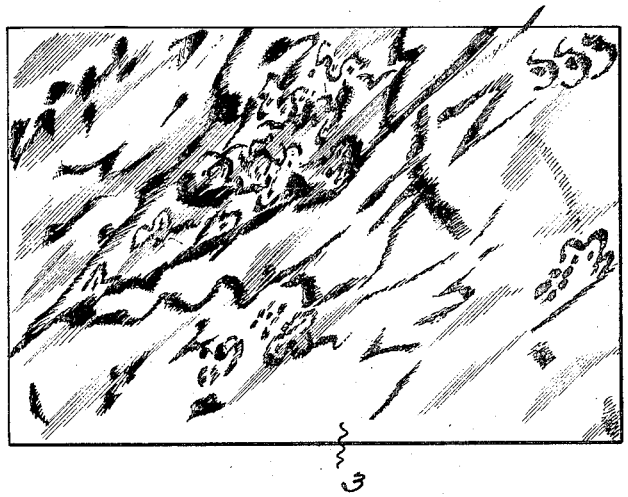

Figure 1 of the accompanying drawings shows a section of the wall of an apartment finished according to this invention. Fig. 2 is a front view of what is shown in Fig. 1.

The treatment embodying this invention may be applied to walls and columns having a foundation or base of plaster board, wooden lath, wire lath, brick or tile, covered with ordinary brown mortar, pulp plaster, cement mortar, lime and sand mortar, or cement and sand mortar. The treatment is illustrated as applied to a layer of common brown mortar 1 on an ordinary plaster board base 2. The outer layer 3, which is the result of this invention, consists of a body composed mainly of substantially one part of marble dust, one part of lime and two parts of Keene's cement, wet with water and applied to the mortar or rough plaster in the customary way of applying a smooth or so-called hard white finish to walls. This finishing composition is usually troweled on to the mortar and smoothed with a common plasterer's board. On this a solution of lime and water is floated and smoothed by pressure. When this has become set, although it is still green or wet, the surface is painted with a pigment of the desired color and in such a manner as to simulate the markings of the marble it is desired to imitate. The pigment is conveniently applied by a big brush to obtain marble veins and by a sponge to obtain the mottling effect. After the paint thus applied has had time to soak in and spread a little but before it has dried the surface of the green wall is rubbed over with a plasterer's trowel to press the color into the body. When this has become set a thin coating of lime and water is applied with a brush, and before this has dried the surface is again rubbed with a plasterer's trowel until it shines and glistens like natural marble. After the wall thus finished has become dry and very hard it may if desired be polished with wax and turpentine rubbed in with a cloth. This fills the pores and makes the surface waterproof. By following this simple method sections of kitchen walls, bath room walls, corridor walls and columns already erected in a building, may be finished very inexpensively so as to closely resemble natural polished marble. The pigment may be of any desired color or tint and the veining and mottling may be done according to the taste of the finisher.

The invention claimed is:

1. The method of finishing walls which consists in applying to a plaster foundation a liquid composition of marble dust, lime and Keene's cement, veining and mottling said composition before it is dry with a pigment, rubbing said pigment into the composition before it is dry, brushing over said painted composition with a solution of lime and water, and polishing the surface down before it dries.

2. The method of treating walls which consists in applying to a base a liquid composition of marble dust, lime and Keene's cement, smoothing the outer surface of said composition after it is set but before it is dry, veining with a brush and mottling with a sponge the surface of said composition before it is dry with a suitable pigment, rubbing said veining and mottling into the composition, applying a solution of lime and water to the veined and mottled surface, and polishing said surface until it is smooth, 3. The method of treating walls which consists in applying to a base a liquid composition of marble dust, lime and Keene's cement, smoothing the outer surface of said composition after it is set but before it is dry, veining with a brush and mottling with a sponge the surface of said composition with a suitable pigment, rubbing said veining and mottling into the composition, applying a solution of lime and water to the veined and mottled surface, troweling said surface until it shines, and finally polishing said surface with wax and turpentine.

SANTO CALOGERO FARANDA.